(12) United States Patent
McGuire (10) Patent No.: US 6,856,396 B2
(45) Date of Patent: Feb. 15, 2005

(54) WIND SHEAR DETECTION SYSTEM

(75) Inventor: Brian McGuire, New South Wales (AU)

(73) Assignee: Swan International Services PTY, New South Wales (AU)

(*) Notice: Subject to any disclaimer, the term of this patent is extended or adjusted under 35 U.S.C. 154(b) by 79 days.

(21) Appl. No.: 09/972,896

(22) Filed: Oct. 10, 2001

(65) Prior Publication Data

US 2003/0067605 A1 Apr. 10, 2003

(51) Int. Cl.$^7$ ................................................ G01B 9/02
(52) U.S. Cl. ..................................... 356/450; 356/28.5
(58) Field of Search ............................... 356/28.5, 342, 356/450

(56) References Cited

U.S. PATENT DOCUMENTS

| | | | |
|---|---|---|---|
| 3,856,402 A | 12/1974 | Low et al. | |
| 4,195,931 A | 4/1980 | Hara | |
| 4,359,640 A | 11/1982 | Geiger | |
| 4,585,341 A | 4/1986 | Woodfield | |
| 4,589,070 A | 5/1986 | Kyrazis | |
| 4,937,447 A | 6/1990 | Barrett | |
| 5,077,558 A | 12/1991 | Kuntman | |
| 5,272,513 A | * 12/1993 | Vahala et al. | 356/28.5 |
| 5,394,238 A | 2/1995 | Mocker et al. | |
| 5,523,759 A | 6/1996 | Gillberg et al. | |
| 6,034,760 A | 3/2000 | Rees | |
| 6,188,330 B1 | 2/2001 | Glover | |
| 6,272,433 B2 | 8/2001 | Baron et al. | |

OTHER PUBLICATIONS

Didier Bruneau "Mach–Zehnder Interferometer as a Spectral Analyzer for Molecular Doppler Wind Lidar" Jan. 20, 2001 (pp 391–399)vol. 40, No. 3, Optical Society of America.

Federal Aviation Administration, Technical Standard Order (TSO–C129a) "Airborne Supplemental Navigation Equipment Using the Global Positioning System (GPS)" Feb. 20, 1996 (pp 1–37), Dept. of Transportation, Wash D.C.

Federal Aviation Administration, Technical Standard Order (TSO–C117A) "Airborne Windshear Warning and Excape Guidance Systems for Transport Airplanes" Aug. 1, 1996 (pp 1–81), Dept of Transportation, Wash D.C.

Zgaoyan Lieu et al. "Differential Discrimination Techniques for Incoherent Doppler Lidar to Measure Atmospheric Wind and Backscatter Ratio", Optical Review, 1966 (pp 47–52), vol. 3, No. 1, Optical Society of Japan, Tokyo, Japan.

Zgaoyan Lieu et al., "Differential Discrimination Technique for Incoherent Doppler Lidar to Measure Atmospheric Wind and Backscatter Ratio", Optical Review (1966) pp 47–52; vol. 3, No. 1.

Russelltarg et al. "Coherent lidar airborne windshear sensor: performance evaluation" Article: Applied Optics (May 20, 1991/vol. 30, No. 15) pp 2013–2026.

* cited by examiner

Primary Examiner—Gregory J. Toatley, Jr
Assistant Examiner—Michael A. Lyons
(74) Attorney, Agent, or Firm—Burns, Doane, Swecker & Mathis, LLP (57) ABSTRACT

An Airborne Windshear Detection System measures wind during the Take off and Landing phase by determining the Doppler Shift of backscattered radiation that is transmitted by an on-board laser system. The collected, scattered light is mixed with a sample from the transmitting Laser using a Dual Differential Mach-Zehnder Interferometer technique. The resulting frequency shift determines the presence of dangerous windshear in the anticipated trajectory of the aircraft.

15 Claims, 9 Drawing Sheets

DELAY TABLE

| Delay | Range Rn km | Delay μ sec |
|-------|-------------|-------------|
| 2 | 0.2 | 2.650 |
| 3 | 0.3 | 3.975 |
| 4 | 0.4 | 5.300 |
| ⋮ | | |
| 40 | 4.0 | 53.000 |

WIND SHEAR DETECTION SYSTEM

FIELD OF THE INVENTION

The present invention relates to aircraft on-board detection and predicting of atmospheric conditions including dangerous windshear conditions which may dangerously occur during the critical landing and take off phase.

BACKGROUND OF THE INVENTION

Windshear is a problem experienced by aircraft as a result of rapidly changing wind conditions. On approach to landing a performance-increasing headwind may be replaced by a performance-decreasing tailwind. An airborne forward looking windshear detector can warn a pilot that he is approaching a windshear hazard.

Recent advances in Ground Based Weather Detection Systems have seen the limited introduction of Ground Based Windshear Detection systems. An example of which is disclosed in U.S. Pat. No. 6,272,433. In view of complexity and cost of such systems their use is often restricted to facilities of very high traffic usage.

Recent advances in Airborne Equipment such as that disclosed in U.S. Pat. No. 6,188,330 act to detect and measure windshear as is it is currently effecting the aircraft. Such equipment detects changes from a standard pattern and infers the presence of windshear. While such systems provide additional information their benefit is restricted as they do not provide for the advanced prediction of dangerous windshear conditions.

Other advances, such as those disclosed in U.S. Pat. No. 6,034,760 act to detect Windshear and other related Phenomena by means of characterising weather sounds in the atmosphere. Unfortunately, such equipment is unable to detect localised conditions as may impact an aircraft during the critical landing and take off phases.

Other advances, such as those disclosed in U.S. Pat. No. 5,394,238, act to detect Windshear by means detecting received backscatter from a light pulse and processing this return into a signal that indicates whether there is windshear or turbulence. Hoowever, such equipment is unable to detect wind speed changes as may impact an aircraft during the critical landing and take off phases.

Other advances, such as those disclosed in U.S. Pat. No. 5,077,558 have seen the introduction of on-board weather detection systems. Such equipment provides for the display of a range of weather conditions including windshear. Such Airborne Windshear Detection equipment using Weather Radar incorporates complex transmission and detection control systems and their application is directed to transport category aircraft.

Other advances, such as those disclosed in U.S. Pat. No. 4,937,447 act to detect Windshear and other related Phenomena by means of detecting temperature gradients in the atmosphere. Such equipment is unable to detect localised conditions as may impact an aircraft during the critical landing and take off phases.

SUMMARY OF THE INVENTION

It is an object of the present invention to provide an improve airborne system for detecting atmospheric conditions.

In accordance with a first aspect of the present invention, there is provided a method of detecting a windshear condition in an atmosphere in front of an aircraft, the method comprising the steps of: (a) projecting a series of optical pulses into an atmosphere ahead of the aircraft; (b) detecting a series of reflected optical responses from the atmosphere corresponding to reflections from predetermined distances in front of the aircraft; (c) processing the reflected responses to determine a current relative wind speed at the predetermined distances in front of the aircraft; (d) processing the current relative wind speeds to determine if a windshear condition exists in front of the aircraft.

The step (c) preferably can include the step of utilising a global positioning system to determine a current position and utilising the frequency shift of the reflected optical pulse to determine the current relative wind speed at the predetermined distance in front of the aircraft. The optical pulses are preferably derived from a laser having a small wavelength range. The step (c) preferably can include the step of determining the Doppler shift in the reflected response utilising a differential Mach-Zehnder Interferometer. The step (c) can also include the step of storing each of the current relative windspeeds for each of the predetermined distances.

The method can be repeated at regular tin intervals of less than 10 seconds and the predetermined distances can include a range from substantially 0.2 kilometres to 4.0 kilometres in front of the aircraft.

In accordance with a further aspect of the present invention, there is provided a detection system for detecting the presence of windshear in front of an aircraft, the system comprising: a laser for transmitting a first portion of a series of optical pulses in front of the aircraft; a receiver for detecting back scattered light from the transmitted optical pulses; delay means for delaying a second portion of the series of optical pulses for a time period substantially corresponding to the time of flight of the back scattered light; and first comparison means for comparing the delayed second portion with the back scattered light so as to determine a wind velocity and direction, relative to the aircraft at a series of distances corresponding to the time of flight of each pulse; second comparison means for comparing the wind velocity at the series of distances to determine is a windshear event is present.

The first comparison means preferably can include a Dual Differential Mach-Zehnder interferometer to indicate the frequency difference and positioning between two light beams, the interferometer comprising: a First Mach-Zehnder interferometer incorporating a delay in one arm; and a Second Mach-Zehnder interferometer incorporating a different delay in one arm; and a means of determining the detected output of the First Mach-Zehnder to indicate the doppler shift in a first light beam; and a means of determining the output of the Second Mach-Zehnder to indicate a wind velocity at a reflected distance from the aircraft.

In accordance with a further aspect of the present invention, there is provided a Detection System to predict the presence of windshear along the flight path of an aircraft during the critical landing and take off phase comprising: high powered solid state laser for transmitting a light beam; and receiver to capture a second back scattered light beam from the first beam; and a means to provide a third light beam as a sample of the first beam; and solid state module to delay the third beam for a time corresponding to the transit time of the second light beam and the first light beam; and solid state detector to detect a differential response of the second light beam to the response of third light beam; and solid state computer to record and store a wind velocity measurement.

BRIEF DESCRIPTION OF THE DRAWINGS

Preferred and other embodiments of the present invention will now be described with reference to the accompanying drawings in which.

DETAILED DESCRIPTION OF THE PREFERRED AND OTHER EMBODIMENTS

The preferred embodiment detects wind shear conditions by utilising a laser Doppler velocimeter. The velocimeter measures the wind speed by using the wavelength shift that is caused by the Doppler effect. Additional features are included in the preferred embodiment to identify the wind as a headwind or tailwind.

Figure 1:
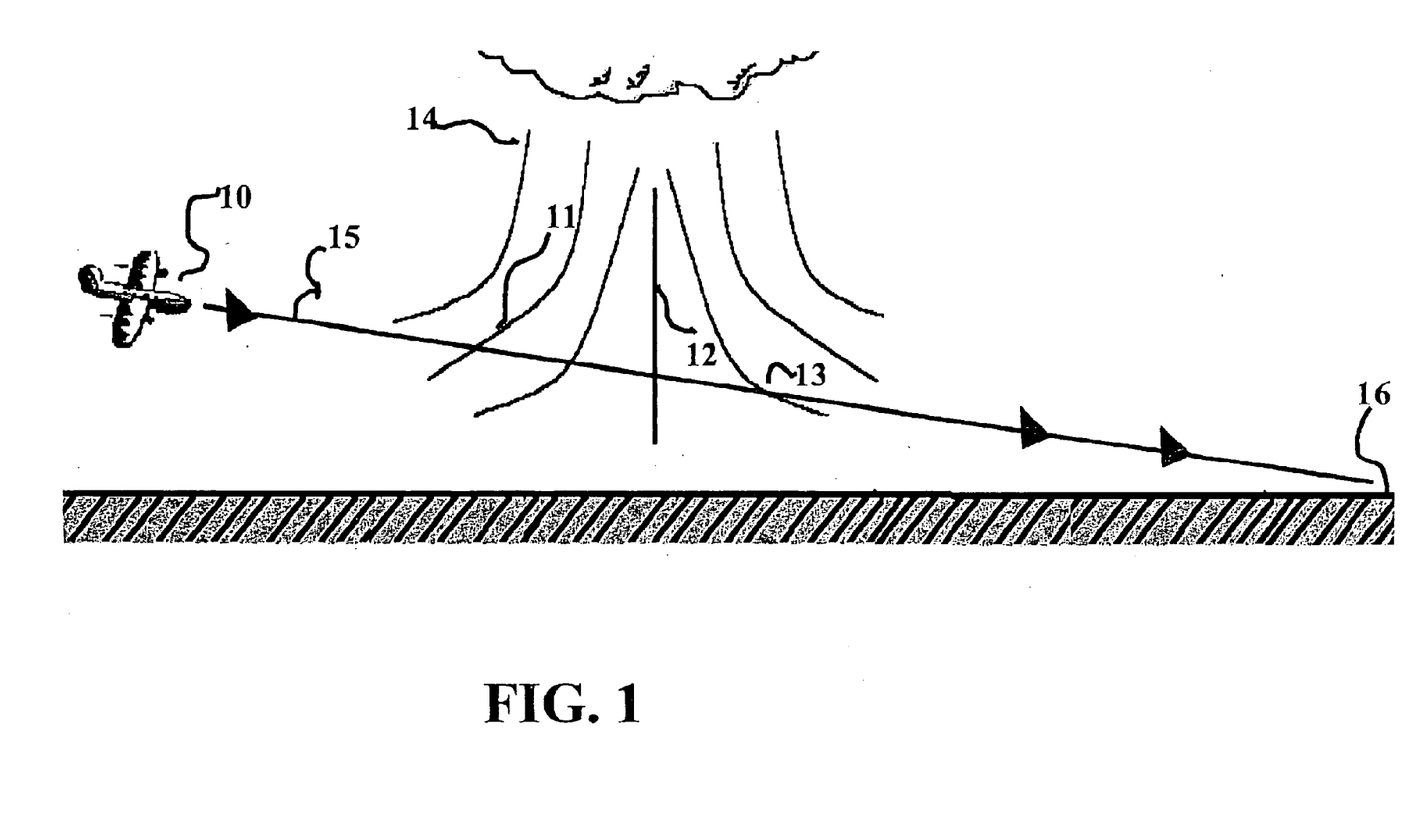
FIG. 1 a depicts an aircraft approaching land with a microburst wind structure located in the intended path.

Turning initially to FIG. 1, there is provided a schematic example of the wind characteristics associated with a microburst structure 14. This structure 14 can be up to 4 kilometers in diameter. An aircraft 10 following a flight path 15 on approach to land at landing area 16 experiences the microburst 14. A substantial region of downdraft 12 exists in the centre of such a microburst structure 14. This down draft spreads horizontally closer to the ground. An aircraft 10 on a fight path 15 will initially experience a headwind 11 upon encountering the microburst. As the aircraft nears the centre of the microburst it will experience significant downdraft 12 and then a shift to a tailwind 13. The change from head wind to a tail wind with an intermediate down draft is indicative of wind shear.

Figure 2:
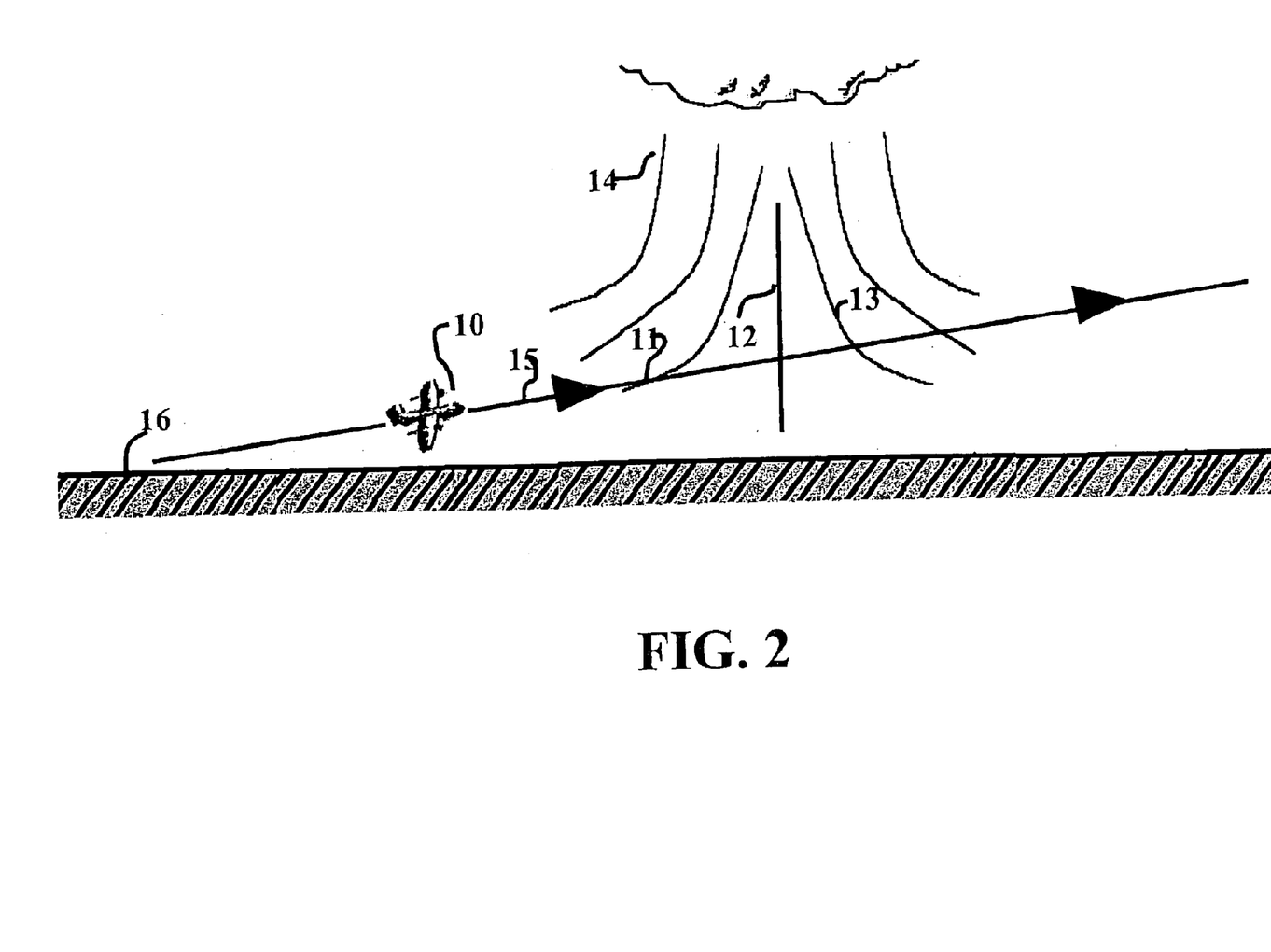
FIG. 2 depicts an aircraft, having recently taken off, encountering a microburst wind structure in it's ascent path.

Turning to FIG. 2, there is illustrated schematically a similar microburst structure 14. An aircraft 10, having taken off from take-off area 16, is following flight path 15. This aircraft will likewise initially experience a headwind 11, followed by a downdraft 12 and then a shift to a tailwind 13. This change from a head wind to a tail wind with an intermediate down draft is also an indication of an encounter with dangerous windshear.

Figure 3:
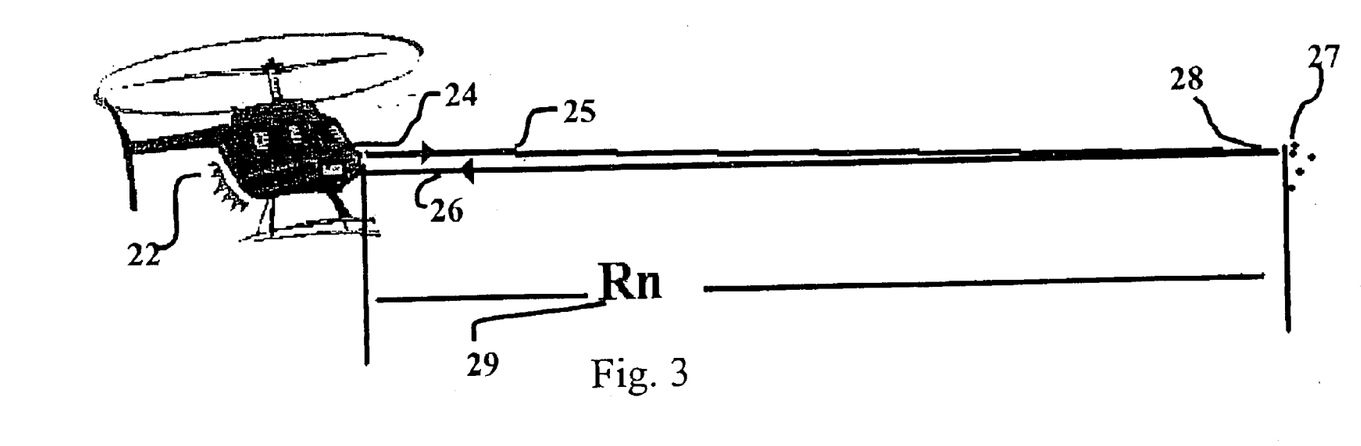
FIG. 3 and FIG. 4 illustrate alternate fixed and rotary wing applications of the present invention.
Figure 4:
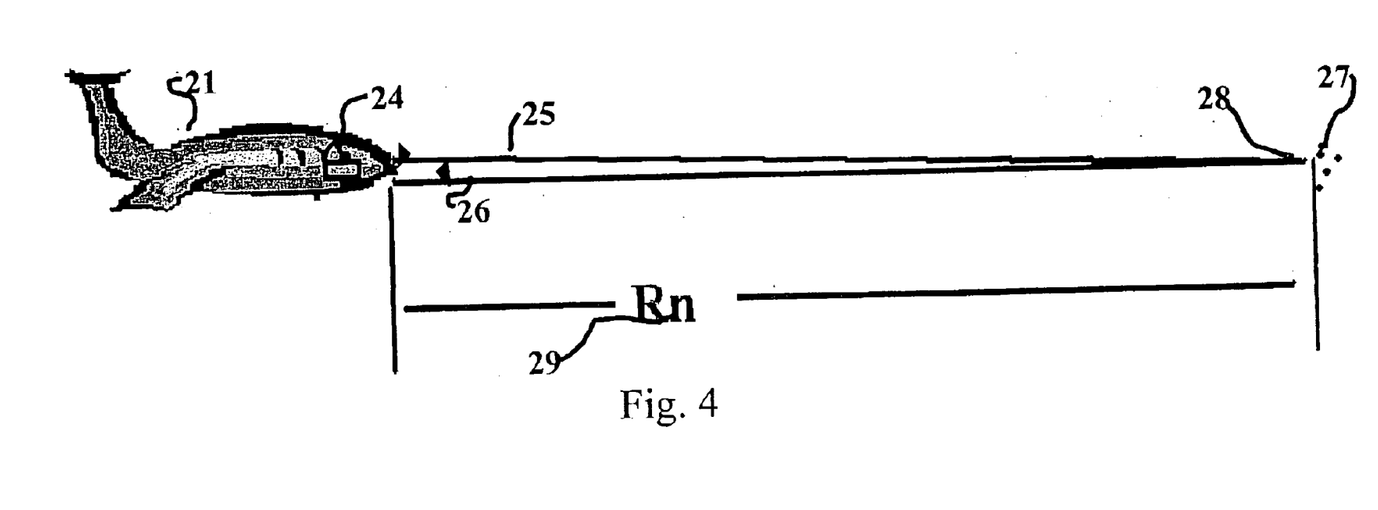

Turning to FIG. 3 and FIG. 4 there is illustrated schematically, the operational environment of the preferred embodiment wherein a fixed 21 or rotary 22 winged aircraft is equipped with an airborne windshear detector and warning system 24 which includes a laser emitter which emits a laser beam 25 directed ahead of the aircraft and encounters atmospheric aerosols 27 at location 28, at a range Rn 29 from the aircraft. The backscattered radiation 26 from the location of aerosols 27 is Doppler shifted in frequency by an amount proportional to the velocity of the aerosols relative to aircraft 21, 22.

Figure 5:
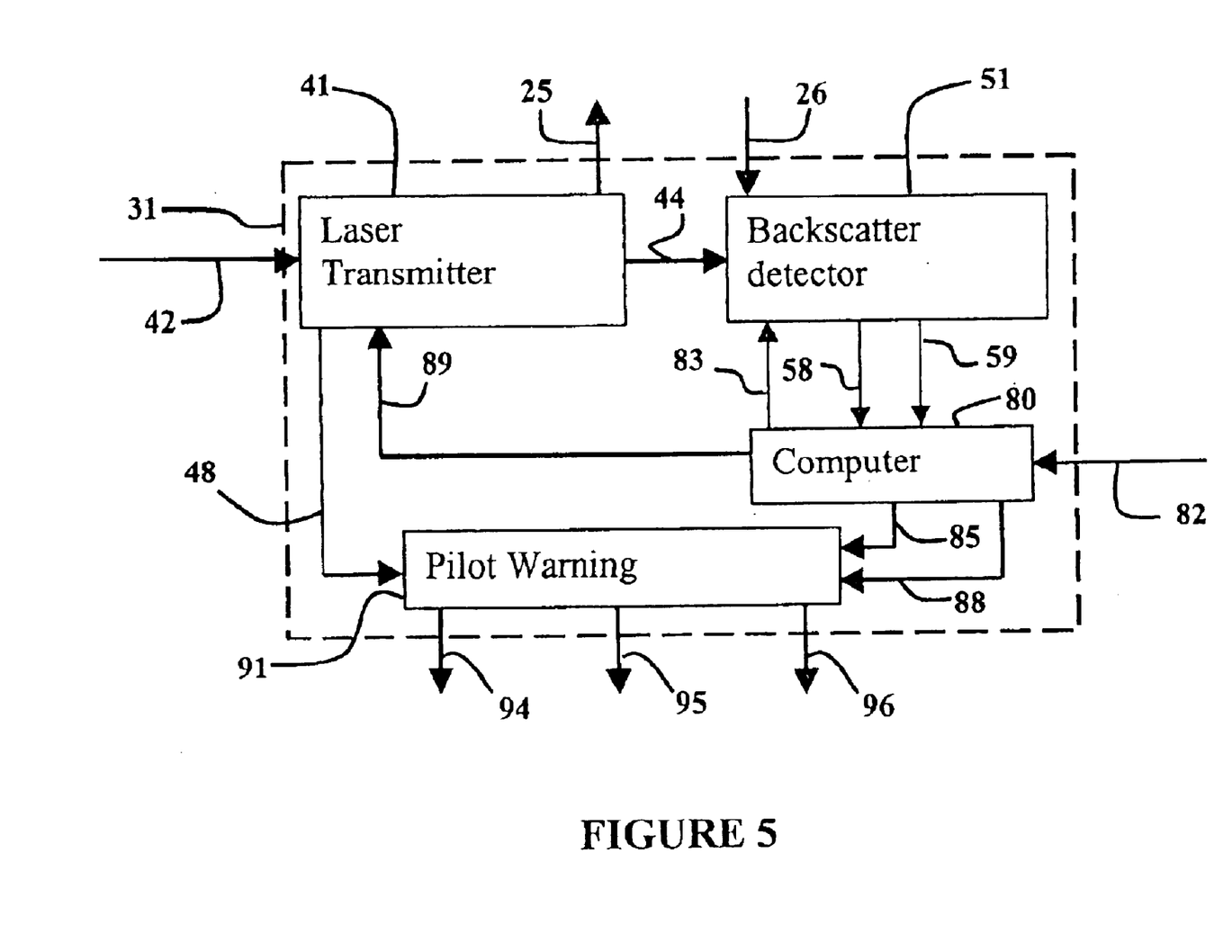
FIG. 5 is a schematic block diagram of preferred embodiment.

Turning now to FIG. 5, there is illustrated schematically the major components of the preferred embodiment 31. A Laser Transmitter module 41 generates an optic pulse 25 that is transmitted ahead of the aircraft. The Detector module 51 receives the backscattered signal 26 and processes this signal to produce dual outputs 58 and 59 which relate to wind magnitude and orientation. The Computer module 81 processes the signals 58 and 59. In the event of detecting an appropriate windshear occurrence for the appropriate exposure time a windshear warning signal 85 is output to a Pilot Windshear Warning module 91. System malfunction signals 48 and 88 can also be sent to the Pilot Windshear Warning module 91. The Pilot Windshear Warning module 91 annunciates and display a windshear warning event. The Pilot Windshear Warning module 91 also displays system malfunctions.

The optics associated with system 31 including the laser transmitter can operate in the 1550 nm wavelength band. This band is known to have low level of extinction in the atmosphere resulting in improved transmission. As the eye is also opaque to laser radiation in this 1550 um wavelength band the relative safety characteristics of the system are improved. Further, a range of high reliability fibre optic components is now available for this range.

Using a laser beam at 1550 nm will result in a Doppler shift of approximately 1.3 MHz per m/s (about 0.66 MHz per kt) of wind velocity in the radial direction from the aircraft. Using the Doppler shift technique a wind velocity of 5 m/s (10 kt) with a frequency shift of 6.5 MHz is considered a minimum detectable wind. Wind velocities in the order of 20 m/s (40 kt) with a frequency shift of 26 MHz may be encountered in a windshear event.

The Detection System 31 is capable of measuring wind velocities with corresponding Doppler frequency shifts in the range 6.5 MHz to 26 MHz. An aircraft with a ground speed of 30 m/s (60 kt) will travel 600 m in a 20 sec exposure period. An alternate aircraft with a ground speed of 75 m/s (150 Kt) will travel 3000 m in a similar 20 sec exposure. The measuring range for the Detection System is desirably set from a practical minimum of 0.2 km to a maximum of 4.0 km. Utilising modern GPS systems, (As certified to an Industry Standard, say TSO-C129a, "Non-Precision Approach Standard"), a range discrimination spacing of 0.1 km can be established. Depending on requirements, alternate optional ranges and spacing may be selected.

Figure 6:
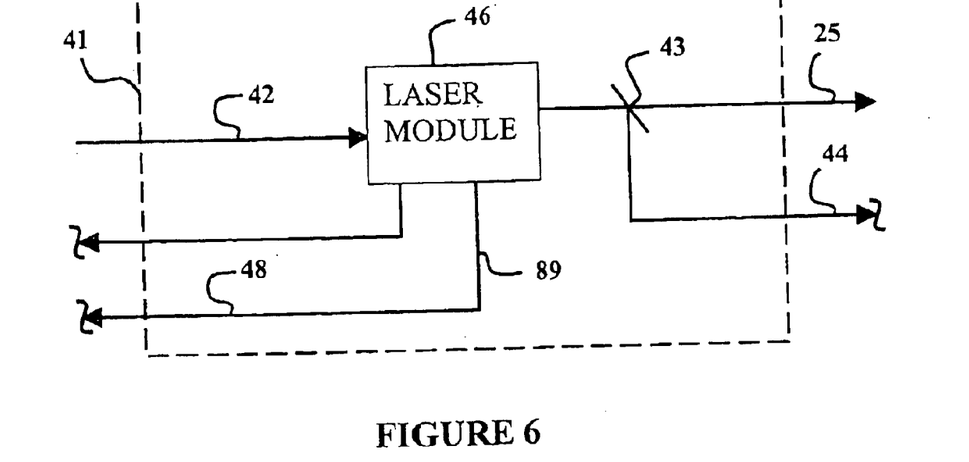
FIG. 6 is a schematic block diagram of the Laser Transmitter.

Turning now to FIG. 6, there is illustrated the Laser Transmitter 41 in more detail incorporating a solid state Erbium laser module 46 with control inputs 42 and monitoring output 48. The solid state Erbium fibre laser module operates in the 1550 wavelength band. Contained within the module is a high reliability laser pump diode system. The laser can be controlled to produce high output peak power pulses of duration in the order of 300 nanoseconds. In order to insure detection discrimination, the laser module 46 ideally operates on a fine line bandwidth. A solid state laser module 41 meeting the above requirements can be commercially obtained. For example, suitable device options include the CQF 938 High Power Laser available as an OEM item from JDS Uniphase Inc.

While the average output power of such a laser system is significant, the laser module may be powered by the on-board aircraft power supply 42. A control input 89 determines the pulse characteristics. Malfunction conditions 48 are sent to the Pilot Windshear Warning module 91.

A portion of the output 44 from the Laser module is directed via Beam Splitter 43 to the Detector module 51. The remaining portion forms beam 25 for output ahead of the aircraft.

Figure 7:
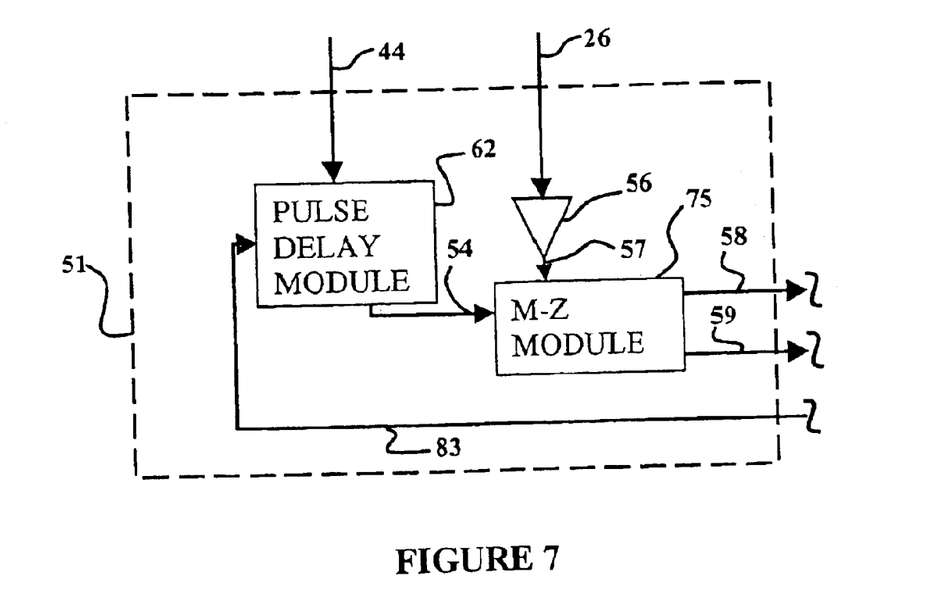
FIG. 7 is a schematic block diagram of the Backscatter Detector.

Turning now to FIG. 7, there is illustrated the detector system 56. The output of the detector system 56 is dependent upon a frequency shift between the frequency of the back-scattered pulse 26 from the frequency of a transmitted pulse 25. The detector module 51 incorporates a pulse delay module 62, a pre-amplifier 56 and a Dual Differential Mach-Zehnder Interferometer 75. The beam 44 split from the output beam is processed by the pulse delay module 62 and directed to the Mach-Zehnder nmodule 75. The returned beam 26 is pre-amplified by amplifier 56 to increase the signal for further processing. The resultant light beam 57 is also directed to the Mach-Zehnder module 75. The outputs 58 and 59 from the Mach-Zehnder module 75 are directed to the computer module 80.

Figure 8:
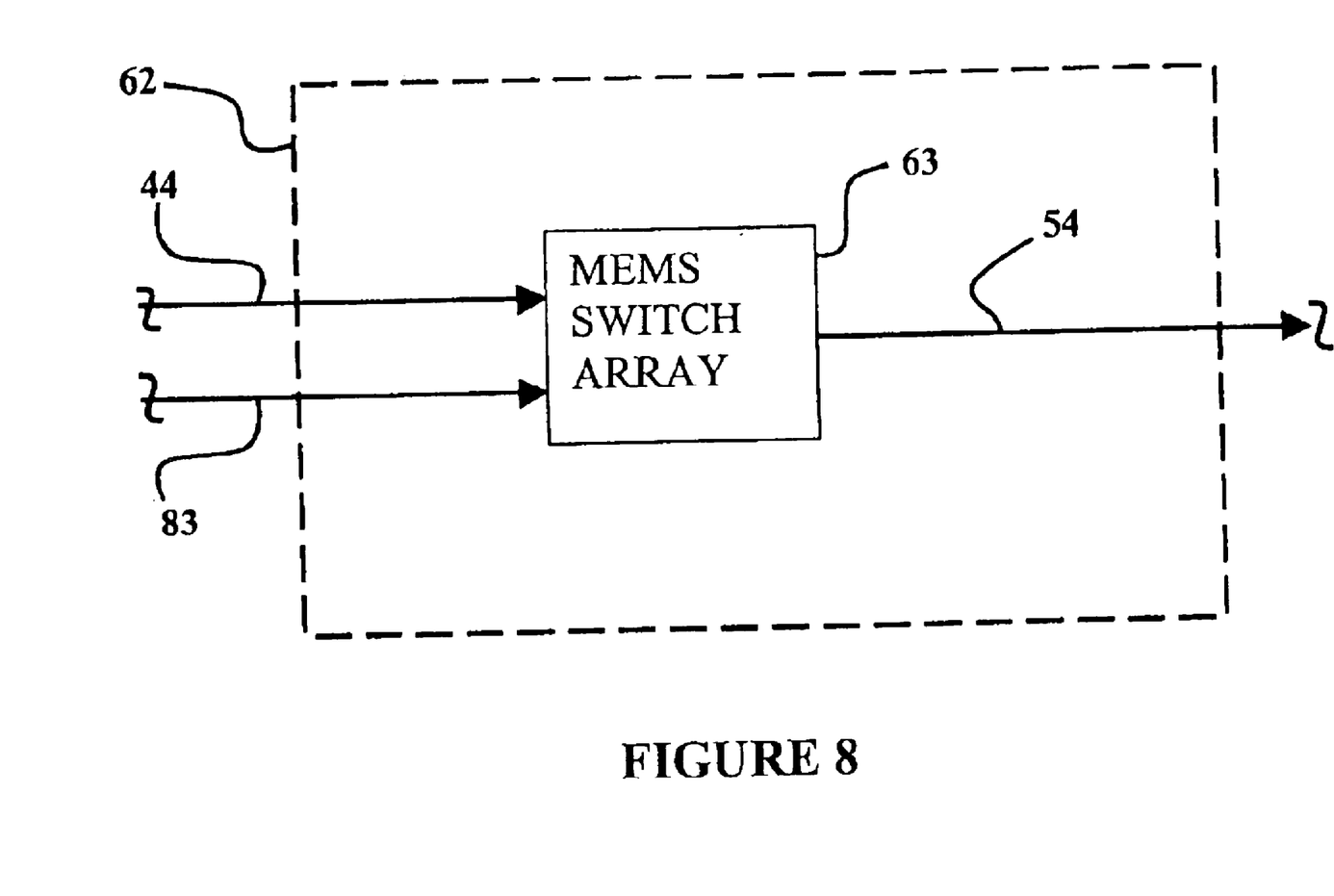
FIG. 8 is a schematic block diagram of the Pulse Delay Module.

Turning now to FIG. 8, there is illustrated the Pulse Delay module 62 containing a MEMS Switch Array 63. Using Photonic Switching incorporating Micro Electro Mechanical Systems (MEMS) technology, the light signal 44 is optically switched though a selected series of delays that indicate the range spacing Rn Km 29. Controlled via Range Signal 83 from Bin & Control Module 87, a set of 39 such MEMS switches sequentially switch the laser output 44 though a set of 39 potential delays. Each incremental delay is equivalent to an incremental range difference of 0.1 Km.

Figure 9:
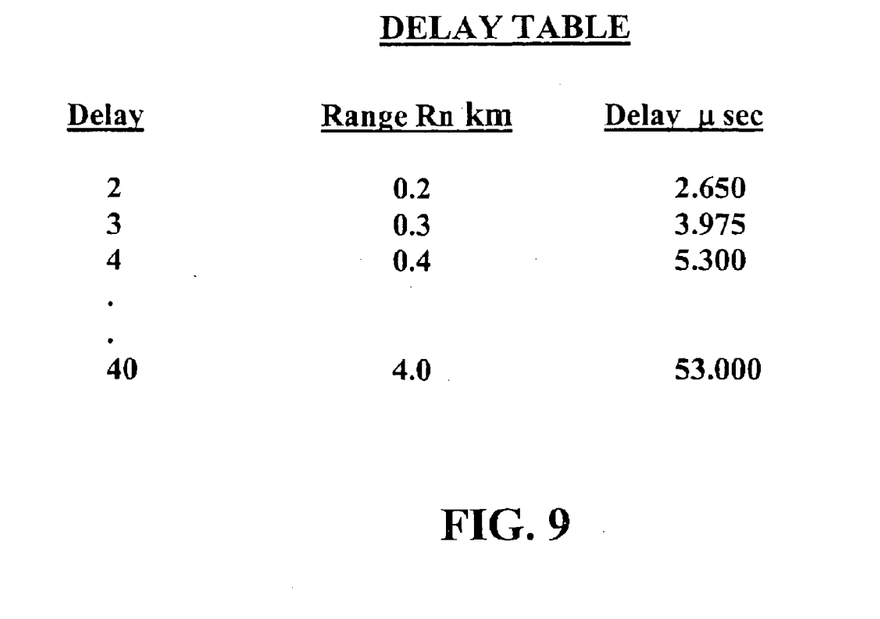
FIG. 9 is a table of pulse delay and corresponding range.
Figure 10:
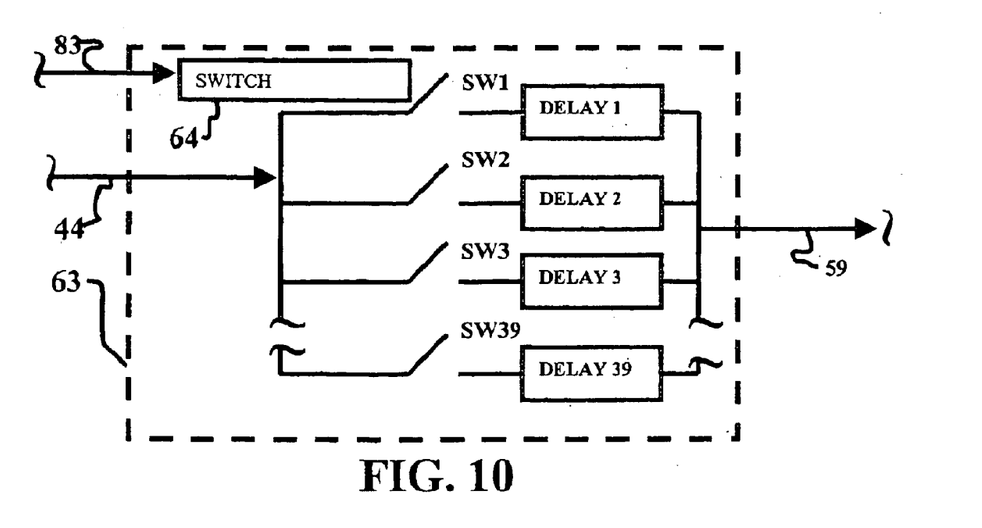
FIG. 10 is a schematic block diagram of the MEMS switch array.

In FIG. 9 there is illustrated a table of the Range and corresponding delay, in microseconds, required in the MEMS switch array. Turning now to FIG. 10, there is illustrated the 1×39 MEMS Switch Array 63. The laser signal 44 is directed to a 1×39 MEMS Switch Array 63. This contains an array of MEMS switches (Normally Open) controlled by Range Signal 83. At any point in time only one MEMS Switch will be in the ON (Closed) position. The Range Signal acting through the MEMS Switch Controller 64 will initially close Switch SW1 and delay the next pulse by 2.65 $\mu$ sec. Following release of this pulse the Switch SW1 will open and Switch SW2 close to delay the next available pulse by 3.975 $\mu$ sec. The Switch Array will be similarly progressed through to the last Switch SW39 and the cycle continuously repeated.

Each delay can be specified such that the delay can equate to the estimated time delay incurred in the transmission of Beam 25 and the return of the Beam 26 for the Range Rn km. Using the range assumptions above the pulse delays will range from 2.6 psec to 53 $\mu$ sec. Each pulse train will have an incremental delay of 1.325 $\mu$ sec. The use of a MEMS switch results in very high speed switching of the laser output 44 with no signal disruption. The pulse delay can be implemented using a range of fibre spools or the use of fibre optic delay components.

Each delay signal 83 is activated in turn such that a series of pulse trains 54 each with the appropriate delay is directed to the Mach Zehnder Interferometer 75.

Figure 11:
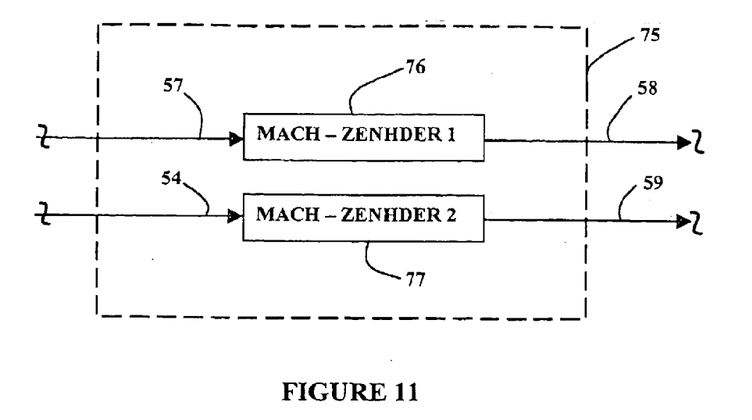
FIG. 11 is a schematic block diagram of the Dual Differential Mach-Zehnder Interferometer module.

Turning to FIG. 11, there is illustrated the Dual Differential Mach-Zehnder Interferometer module 75. The signal 57 from backscatter return 26 is processed by Mach-Zehnder1 76 incorporating a delay in one arm. The detected output 58 will be dependent on the frequency of the returned beam.

The signal 54 from the Pulse Delay module 62 is processed by Mach-Zehnder2 77 also incorporating a delay in one arm. The detected output 59 will be dependent on the frequency of the transmitted beam.

The delay for Mach-Zehnder1 is different to the delay for Mach-Zehnder2. This difference in the delays allows for a frequency difference in the range of 6.5 MHz to 26 MHz to be detected.

Figure 12:
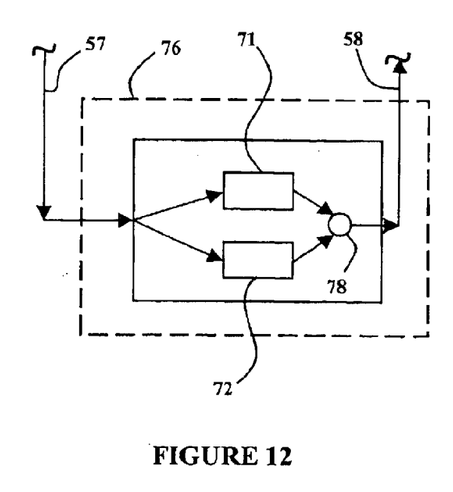
FIG. 12 and FIG. 13 illustrated further details of the Dual Differential Mach-Zehnder Interferometer.
Figure 13:
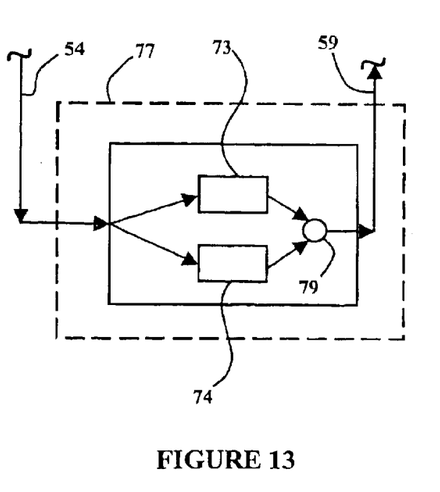

FIG. 12 and FIG. 13 further clarify the operation of unbalanced Mach-Zehnder module 76 and unbalanced Mach-Zehnder module 77. In Mach-Zehnder module 1 76, the optical signals 57 travel via the Upper Arm 71 and Lower Arm 72 todetector 78. Incorporated into the upper arm is a delay line which gives an optical path length difference between the upper and lower arms. The resultant output signal 58 from detector 78 indicates the interaction between the delayed path and the non-delayed path. With an appropriate selection of delay in the upper arm the output 58 is proportional to the Doppler Frequency shift. Detector 78 should be selected for maximum sensitivity. Options include p-i-n or avalanche photodiodes.

In Mach-Zehnder module 2 77, the optical signals 54 travel via the Upper Arm 73 and Lower Arm 74 to detector 78. Likewise incorporated into the upper arm is a delay line which gives an optical path length difference between the upper and lower arms. The resultant signal 59 indicates the interaction between the delayed path and the non-delayed path. The delay in the upper arm 73 is selected for the range but will be marginally different to that in arm 71. In order to effect discrimination between output 58 and output 59 a typical 15% difference should be established between the delay in arm 71 versus the delay in arm 73. The appropriate delays can be achieved by inserting lengths of fibre appropriately selected to result in a phase shift of up to half wave length. The length is selected for desired range about a centre frequency. F frequency range of 10 MHz a length of 10 m can be selected. For the example noted with a maximum frequency demodulation requirement of 26 MHz the delay length for arm 71 is set at 26 m and for arm 73 at 30 m.

The technique described above in respect to detection of a frequency change in an optical signal is well known to designers of demodulators as used in communications systems.

Figure 14:
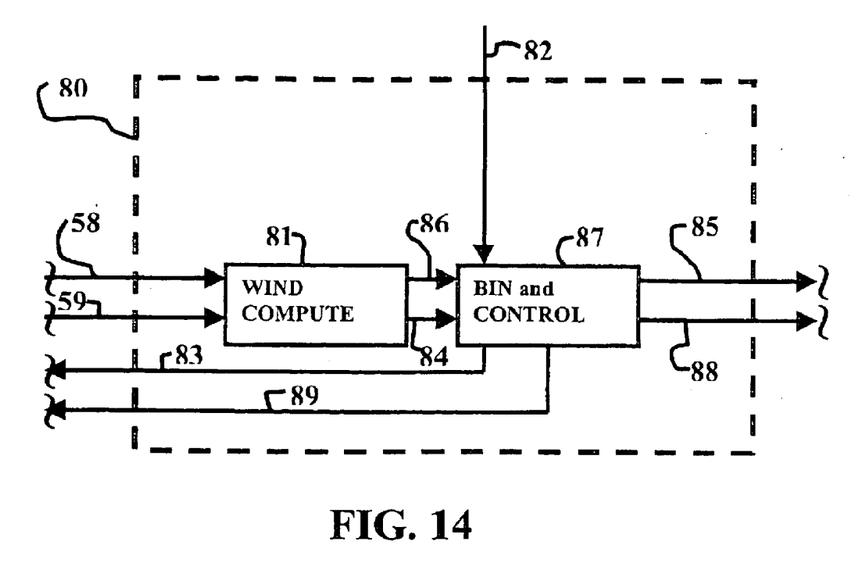
FIG. 14 is a schematic block diagram of the computer module.

FIG. 14 illustrates the computer module 80. The signal 58 from Mach-Zehnder 1 and signal 59 from Mach-Zhender 2 are compared in Wind Compute module 81 to determine which is of a greater magnitude. The Windshear Warning and Detection System can be tuned such that a greater signal 58 indicates a headwind. Correspondingly a greater signal 59 will indicate a tailwind. As a result, a positive output 84 from wind compute module indicates a headwind; a negative output 84 indicates a tailwind. The wind speed at range Rn km 86 is determined as the difference between signal 59 and signal 58.

In the embodiment a Bin Table Register with some 39 Range Bins each associated with 0.1 Km spacing are established in Bin & Control module 87. Each Bin will hold a wind speed signal 86 and orientation signal 84. Each Bin is related to a radial distance Rn Km from the current location.

A GPS location signal 82 received from an on board Global Positioning System Receiver (not shown) (Specified to TSO-C129a, "Non-Precision Approach Standard") indicates the current positioning coordinates, track and Aircraft Ground Speed. With the knowledge of current position and track from GPS signal 82 each range bin can be associated with a current spatial position. The use of ground speed rather than air speed in the bin progression process offers improved accuracy as air speed is impacted by changes in headwind or tailwind.

Each set of pulse trains results in a new set of signals 86 and 84 for each range. As the aircraft continues on the flight path the spatial position of each bin will change in accordance with ground speed 82. As the aircraft progresses on its flight path new positions will be established in the bin table register and old positions dropped out of the bin table register.

In the embodiment the Bin Table Register is updated each five seconds. The wind speed 86 and orientation 84 signal is added to a new appropriate bin as determined by the aircraft's movement within that period. At each update the bin contents are reviewed to determine the change of wind over time for each bin. In an example with a stationary aircraft having no Ground Speed the bin contents are updated without change to the register. In an example with a 80 kt ground speed, equating to 200 m or two spacings in 5 sec, the contents of each bin will be transferred to a new bin position, a difference in the register of two from that previous. In a further example with a 120 kt ground speed, equating to 300 m or three spacings in 5 sec, the contents of each bin will be transferred to a new bin position, a difference in the register of three from that previous. The technique described in respect to range resolution and associated range bin update is well known to designers of doppler radar systems,.

Use of this method allows for the wide variation experienced in aircraft landing and take off velocities. In addition the method effectively compensates for variation in ground speed as a result of strong headwind or tailwind conditions.

Warning alert signal 85 will indicate a change that corresponds to a windshear warning alert level. A malfunction of the Computer Module 81 is indicated via warnings signal 88

Figure 15:
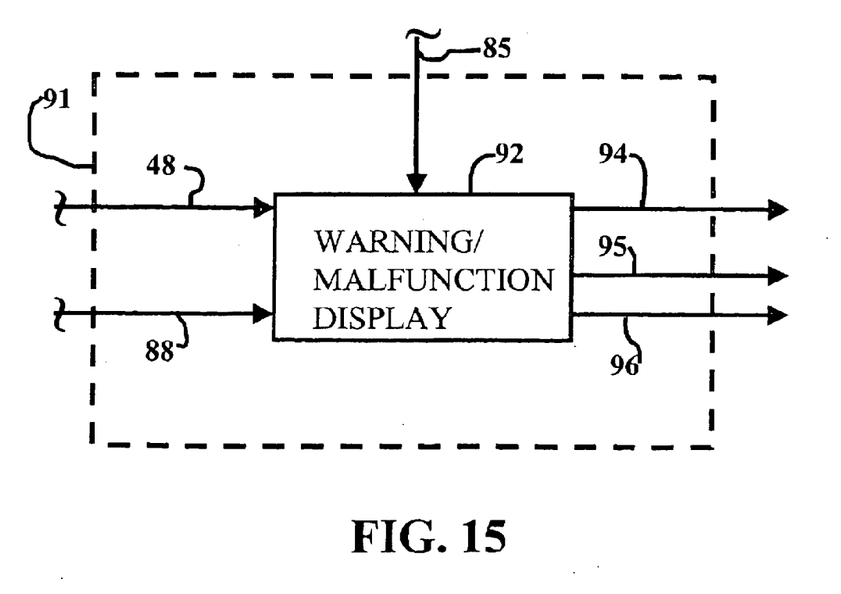
FIG. 15 is a schematic block diagram of the pilot windshear warning system.

Turning now to FIG. 15, there is illustrated schematically the Pilot Windshear Warning Module 91. A warning alert signal 85 is processed in the Warning/Malfunction Display module 92 to result in a visual display 94 and an audio alert 95. The malfunction alert signals 48 and 88 are process in the Warning/Malfunction Display module to results in a visual display 96.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims. The foregoing describes embodiments of the present invention and modifications, obvious to those skilled in the art can be made thereto, without departing from the scope of the present invention.

What is claimed is:

1. A method of detecting a windshear condition in a remote atmosphere in front of an aircraft, the method comprising the steps of:
   (a) projecting a series of optical pulses into a remote atmosphere ahead of the aircraft;
   (b) detecting backscattered light from the remote atmosphere corresponding to reflections from a series of distances in front of the aircraft greater than 200 meters away from the aircraft;
   (c) processing said reflected responses from the remote atmosphere to determine a current relative wind speed at said series of distances in front of said aircraft;
   (d) processing said current relative wind speeds to determine if a windshear event is present in the vicinity of the back scattering of said backscattered light.

2. A method as claimed in claim 1 wherein said step (c) includes the step of:
   utilising a global positioning system to determine a current position and the frequency shift of said reflected optical pulses to determine the current relative wind speeds at said predetermined different distances in front of said aircraft.

3. A method as claimed in claim 1 wherein said optical pulses are derived from a single laser device having a small wavelength range.

4. A method as claimed in claim 1 wherein said step (c) includes the step of:
   determining the Doppler shift in the reflected response utilising a differential Mach-Zehnder Interferometer.

5. A method as claimed in claim 1 wherein said step (c) includes the step of:
   storing each of said current relative windspeed for each of said predetermined distances.

6. A method as claimed in claim 1 wherein said method is repeated at regular time intervals of less than 10 seconds.

7. A method as claimed in claim 1 wherein said predetermined distances include a range from substantially 0.2 kilometres to 4.0 kilometres in front of the aircraft.

8. A detection system for detecting the presence of windshear in front of an aircraft, said system comprising:
   a laser for transmitting a first portion of a series of optical pulses in front of said aircraft;
   a receiver for detecting back scattered light from said transmitted optical pulses;
   delay means for delaying a second portion of said series of optical pulses for a time period substantially corresponding to the time of flight of said back scattered light;
   first comparison means for comparing said delayed second portion with said back scattered light so as to determine the Doppler shift of the back scattered light and a wind velocity and direction, relative to said aircraft at a series of distances corresponding to said time of flight of each pulse; and
   second comparison means for comparing the wind velocity at said series of distances to determine whether a windshear event is present in the vicinity of the back scattering of said backscattered light.

9. A system as claimed in claim 8 wherein said first comparison means includes a Dual Differential Mach-Zehnder interferometer to indicate the frequency difference and positioning between two light beams, said interferometer comprising:
   a First Mach-Zehnder interferometer incorporating a delay in one arm;
   a Second Mach-Zehnder interferometer incorporating a different delay in one arm;
   a means of determining the detected output of the First Mach-Zehnder interferometer to indicate the doppler shift in a first light beam; and
   a means of determining the output of the Second Maoh-Zehnder interferometer to indicate a wind velocity at a reflected distance from said aircraft.

10. A Detection System to predict the presence of windshear along the flight path of an aircraft during the critical landing and take off phase comprising:

high powered solid state laser for transmitting a light beam;

receiver to capture a second back scattered light beam from the first beam;

a means to provide a third light beam as a sample of the first beam;

solid state module to delay said third beam for a time corresponding to the transit time of the second light beam and the first light beam;

solid state detector to detect a differential response of the second light beam to the response of third light beam, said differential response corresponding to a wind velocity measurement in the vicinity of the backscattering of said second backscattered light beam; and solid state computer to record and store wind velocity measurement.

11. A method of detecting current wind velocity at a series of distances exceeding 200 meters from an aircraft along a flight path of the aircraft and determining when differences in the detected wind velocities exceed a predetermined amount, the method comprising the steps of:

(a) projecting a series of optical pulses into an atmosphere ahead of the aircraft;

(b) detecting backscattered light from the remote atmosphere corresponding to reflections from a series of distances in front of the aircraft greater than 200 meters away from the aircraft;

(c) processing said reflected responses from the remote atmosphere to determine a current relative wind speed at said series of distances in front of said aircraft; and (d) processing said current relative wind speeds to determine if a windshear event is present in the vicinity of the back scattering of said backscattered light.

12. A detection system for detecting the presence of differences in wind velocity at a series of distances in front of an aircraft, said system comprising:

a laser for transmitting a first portion of a series of optical pulses in front of said aircraft;

a receiver for detecting back scattered light from said transmitted optical pulses;

delay means for delaying a second portion of said series of optical pulses for a time period substantially corresponding to the time of flight of said back scattered light; and first comparison means for comparing said delayed second portion with said back scattered light so as to determine a wind velocity and direction, relative to said aircraft at a series of distances corresponding to said time of flight of each pulse; and second comparison means for comparing the wind velocity at said series of distances to determine if differences in wind velocity exceed said predetermined amount in the vicinity of the backscattering of said back scattered light.

13. A detection system to predict the presence of spatial alterations in wind velocity exceeding a predetermined amount along the flight path of an aircraft during the critical landing and take off phase comprising:

high powered solid state laser for transmitting a light beam;

receiver to capture a second back scattered light beam from the first beam;

a means to provide a third light beam as a sample of the first beam;

solid state module to delay said third beam for a time corresponding to the transit time of the second light beam and the first light beam;

solid state detector to detect a differential response of the second light beam to the response of third light beam; and solid state computer to record and store a wind velocity measurement.

14. A detection system as claimed in claim 13, further comprising a global positioning system for associating a current position with each wind velocity measurement.

15. A method of detecting windshear in front of an aircraft, the method comprising the steps of:

(a) transmitting a first portion of each of a series of optical pulses in front of the aircraft;

(b) receiving and detecting back scattered light from the backscattering of said optical pulses in the atmosphere in front of the aircraft;

(c) delaying a second portion of each of said series of optical pulses for a time period substantially corresponding to the time of flight of said back scattered light;

(d) comparing the second delayed portion of said optical pulse with the received portion of the optical pulse to determine the Doppler shift of the back scattered light and a wind velocity and direction, relative to said aircraft at a series of distances corresponding to the time of flight of each pulse; and (e) comparing the measured wind velocity at the series of distances to determine whether a windshear event is present in the vicinity of the back scattering of said backscattered light.

* * * * *